United States Patent Office 3,123,502
Patented Mar. 3, 1964

3,123,502
PROCESS FOR STARCH MODIFICATION WITH CHLORINE
William F. Henry and Sheldon I. Greenberg, Minneapolis, Minn., assignors to The Pillsbury Company, Minneapolis, Minn., a corporation of Delaware
No Drawing. Filed Dec. 30, 1960, Ser. No. 79,502
4 Claims. (Cl. 127—71)

This invention relates to a dry process for modification of starch and more particularly to the production of thin boiling starch by dry chlorination at low temperature without attendant drying of the starch material.

For some uses in both the food and non-food industries, it is desirable to modify a starch without gelatinization or dextrinization in such a way that, when pasted by cooking it with water, the paste will be more fluid than paste made from the same concentration of the unmodified starch. Such modified starches are generally referred to as thin boiling starches. For our purposes herein, the term starch shall include water washed starches, wheat flour, cereal flour, and the like.

Thin boiling starches have customarily been made in a wet process by treating regular starch with dilute hydrochloric or sulfuric acid at an elevated temperature for given time periods depending upon the degree of modification desired. In the dry milling of wheat flour, the above method has the disadvantage of involving a wet process. The addition and subsequent removal of moisture is expensive, time consuming and requires much additional equipment. Hence, a treatment which is essentially a dry one is preferred.

Certain dry methods have been developed which require either elevated temperatures, reduced moisture levels, increased atmospheric pressure, utilization of inedible elements or other factors which make them inappropriate for use in a standard flour milling operation. If the starch material must be heated up much additional equipment is required. The same can be said for reducing the moisture level of the material or for providing a process which requires increased atmospheric pressure. If a process uses chemicals which render the modified starch inedible then the end uses of such products are severely limited. Hence, our problem was to develop a process for starch modification to overcome the aforesaid difficulties.

It is an object of our invention to produce thin boiling starches by a dry process without the use of elevated temperatures.

It is a further object of our invention to produce thin boiling starches without the necessity of subjecting the starch material to extreme drying.

It is an additional object of our invention to treat cereal grain flour which contains 85% or more of starch on a dry basis in such manner as to produce a product having thin boiling starch characteristics.

Another object of our invention is to treat either bleached or unbleached cereal flour so as to produce a product having thin boiling starch characteristics.

A further object of our invention is to modify starches with existing chlorination equipment in use in dry milling practices.

An additional object of our invention is to provide a method of producing a starch product which will meet pre-determined requirements of fluidity.

It is still another object of our invention to produce a starch product which will meet pre-determined requirements of fluidity and will subsequently retain a constant degree of fluidity to a very substantial extent for an extended period of time.

Yet another object of our invention is to produce an end starch product which still retains all its water soluble components and which meets pre-determined requirements of fluidity and which will, subsequent to treating, retain a relatively constant degree of fluidity for an extended period of time.

Further objects of our invention will be evident from the description herein.

It is old in the art to bleach flours by the addition of small quantities of chlorine so that the appearance and baking qualities of the flour are found to be improved. It has heretofore been thought that treating of starch with small quantities of chlorine at normal temperatures and normal moisture content would increase the viscosity. It was unexpected that viscosity would be decreased to the extent found possible by our invention when chlorine was used in relatively large quantities in a dry process as contemplated herein.

We have discovered a method for dry chlorination of starch so as to give the desired thin boiling properties. Our process generally comprises the steps of agitating starch in the presence of hydrous chlorine in amounts equal to from 0.2% to 4.0% of the starch on a dry weight basis. Our process is carried out at normal room temperatures on starch which has neither been subjected to unusual drying nor wetting. By our process we have produced starch products which have thin boiling characteristics varying from practically unmodified and thus very low fluidity to products having fluidity nearly equal to that of water. This is accomplished by chlorinating at relatively high levels as is explained hereinafter. By the additional step of neutralizing the previously treated material, the treated starch can be made to retain very nearly the same degree of fluidity over a prolonged period of time.

More particularly our invention can be described by the process as carried out in the laboratory. Here we used a tumbler employed by flour research laboratories for bleaching flour. It is similar to those used for treating small laboratory quantities of wheat flour with small amounts of chlorine. It consists of a metal plastic coated box, approximately one cubic foot in external dimensions, mounted on an axis so that it can be rotated slowly at about 34 r.p.m. about an axis joining the midpoints of two of the opposite sides. It is equipped with a relatively tight fitting cover and two wooden blocks, one of them weighted, which blocks are allowed to drop in and out of the flour as the box turns. In our laboratory experiments we placed 4 lbs. of the starch or flour material in the box. Rotation of the box was started and chlorine was admitted through a hollow tube in one of the bearings holding the box. The amount of chlorine admitted was measured as it came from a commercial cylinder, by means of a gas burette equipped with a leveling bulb filled with chlorine saturated water so that the controlled quantities could be added to the tumbler containing the flour. The tumbler was rotated for an additional 10 minutes after the completion of the addition of the gas. Our purpose in so agitating the flour or starch material was to give it thorough exposure to the chlorine present.

We have discovered that so treating flour or starch in a dry process with relatively large quantities of chlorine imparted an unexpected thin boiling property.

We are not limited to any particular apparatus in performing the process but have used the laboratory blender as a matter of convenience.

We have found that we can produce starches with a fluidity of from 0 to 97. The standard test for determining the fluidity of a modified starch is referred to as the 5 gram alkaline fluidity test. This is a standard test and is similar to the one described in Patent No. 1,871,027 issued to Bergquist. On page 2, lines 69 through 84 the inventor describes the test. Generally speaking by this test a funnel will deliver 100 milliliters of 25° C.

distilled water in 70 seconds. To conduct this test 5 grams of a modified sample of starch is slurried with 10 milliliters of distilled water and 90 milliliters of 1% sodium hydroxide solution. The paste is stirred manually for three minutes with a stirring rod and then the beaker containing starch is placed in 25° C. water bath for 27 minutes. The paste is then allowed to pass through a funnel. If 70 milliliters pass through in 70 seconds then that starch is referred to as having a 5 gram alkaline fluidity of 70. If 50 milliliters pass through in 70 seconds then the starch has a fluidity of 50.

We found that by varying the amount of chlorine which is introduced into the flour we can thereby vary the degree of fluidity of the end product. It was found that the amount of chlorine used may vary from 0.2% to 4.0% of the starch on a dry weight basis. The process has been carried out at normal room temperatures. It has been successfully operated at from 60° F. to 150° F. However we do not consider the temperature to be a critical factor.

It is to be noted that our process is conducted at normal atmospheric pressure although atmospheric pressure is not critical. The moisture content of the material to be treated is likewise not critical. We have successfully conducted the process on starch products whose moisture content varied from 5% to 20%.

The process is conducted under such temperature and moisture conditions that substantially no gelatinization of the starch occurs. However, profound and unexpected changes in fluidity do occur depending upon the amount of chlorine employed, thus giving a new and improved method of producing thin boiling starches. Reference to some examples will further illustrate our invention.

*Example I*

As an example of our invention we conducted a number of treatments using 4 lb. samples of an untreated wheat starch, using our process as described above. The amount of chlorine used varied from 500 mls. to 3500 mls. The alkaline fluidity index was changed from 0.5 to 75.0. Results of these treatments are listed below.

Starch and treatment:              Alkaline fluidity index
   (1) Untreated wheat starch_____ 0.5
   (2) Same starch, 500 mls. of $Cl_2$ per 4 lbs___ 0.5
   (3) Same starch, 1000 mls. of $Cl_2$ per 4 lbs___ 0.5
   (4) Same starch, 2000 mls. of $Cl_2$ per 4 lbs___ 10.5
   (5) Same starch, 2500 mls. of $Cl_2$ per 4 lbs___ 48.0
   (6) Same starch, 2750 mls. of $Cl_2$ per 4 lbs___ 59.0
   (7) Same starch, 3000 mls. of $Cl_2$ per 4 lbs___ 67.0
   (8) Same starch, 3500 mls. of $Cl_2$ per 4 lbs___ 75.0

It will be noted that from the above figures there is very little effect on the fluidity or thin boiling characteristics of the starch until a level of approximately 2000 mls. of chlorine per 4 lbs. starch is added. With increased chlorination above this level the alkaline fluidity increases very rapidly.

*Example II*

In another example, we placed 4 lbs. of untreated wheat starch into the tumbler and added 2250 mls. of chlorine. This material was agitated for 15 minutes at which time the operation was discontinued and the starch removed from the container. It was subsequently determined that the alkaline fluidity of this material was 27.0.

*Example III*

As a third example, we treated 4 lbs. of wheat flour containing 3% protein as in the process above, except that 2250 mls. of chlorine was used. The alkaline fluidity was checked immediately and was found to be 20.0. Then an additional 300 milliliters of chlorine gas was admitted (the starch having remained in the tumbler in this case). The fluidity was checked again and found to be 43. Another 50 mls. of chlorine was added, which raised the fluidity to 50, the desired degree of modification. It can be seen that our process will provide a means of modifying a particular starch to the desired degree of fluidity.

*Example IV*

Four pounds of hard wheat flour containing 10.5% protein was treated according to our process. An untreated sample of this flour had a pH of 5.95 and an alkaline fluidity of 4.0. The 4 lb. sample was then treated with 2000 mls. according to our above described process which increased the fluidity to 32.0 and lowered the pH to 3.10. The flour was then treated with an additional 2000 mls. of chlorine which increased the fluidity to 91.5 and further lowered the pH to 2.3.

*Example V*

We treated 4 lbs. of unmodified cornstarch by our process using 2000 mls. of chlorine. The alkaline fluidity was checked immediately and found to be 30.0. Then an additional 500 milliliters of chlorine gas was admitted and the tumbler agitated as described above. The alkaline fluidity was then found to be 55.0.

We have found that starch or cereal flour will continue to gradually increase in fluidity after the initial treatment. Apparently the acid which is formed in the starch works slowly but continuously to further increase the fluidity. We have discovered that this continued development of increased fluidity can be stopped by proper neutralization. Thus, when a starch material has been treated according to our process above, a relatively constant degree of fluidity can then be maintained by immediately neutralizing the treated material by the addition of a neutralizing agent such as $NH_4OH$. Neutralization may be accomplished in a number of ways, as is known to those skilled in the art. We accomplished neutralization of the four pound samples by using an atomizer to spray the neutralizing agent onto the previously treated starch material, agitating the material so as to thoroughly contact the starch materials with the neutralizers, and then testing the pH of the material. Increasing quantities of the neutralizer was used until the desired pH was achieved. We found that by neutralizing the material back to near its original pH was the optimum degree of neutralization required to cause the starh material to retain a relatively constant degree of fluidity after treating. Another method of neutralizing is by the admission of a gaseous neutralizing agent in the same manner in which the chlorine was caused to be contacted with the starch material. As is well known to those skilled in the art, any number of neutralizing agents may be used such as ammonia gas, sodium carbonate solution, or any alkali metal carbonate. The following examples will illustrate the effect of time upon treated starch material and how a neutralizer can be used to arrest this development.

*Example VI*

Three 4 lb. samples of a wheat flour containing 3% protein were used. One sample was left untreated and the second sample was chlorinated according to our process. The third sample was first chlorinated the same as the second sample and then neutralized by the addition of ammonium hydroxide. The following table shows the results of this test.

| Sample | Final pH | Mls. chlorine used | Grams $NH_4OH$ used | Alkaline Fluidity | | |
|---|---|---|---|---|---|---|
| | | | | Originally | After 6 Weeks | After 11 Weeks |
| 1. Wheat flour untreated_____ | 5.9 | 0 | --------- | 0.5 | 0.5 | 0.5 |
| 2. Wheat flour chlorinated_____ | 2.6 | 3,500 | --------- | 75.0 | 86.0 | 90.0 |
| 3. Wheat flour chlorinated and neutralized_____ | 5.7 | 3,500 | 18 | 48.0 | 47.0 | 45.0 |

Thus it can be seen that wheat flour which has been chlorinated and then placed in storage, continues to increase in fluidity. The sample which was first treated and then neutralized retained very nearly the same degree of fluidity over a period of several months.

Our invention provides many improvements over the prior art. It will be noted that thin boiling starches are thus produced in a dry process. Such starches may be modified without the use of excessive heat or increased pressure. The starch remains substantially unchanged with the exception of the change in thin boiling characteristics. The treated starch material still retains all its water soluble components. Our process may be carried out at normal room temperatures without the necessity for either adding or subtracting from the natural moisture content of the starch material. The process can be performed with existing commercial flour bleaching apparatus. Our process will produce an edible product but it can also be used in non-edible applications. The process can be easily controlled by employing on-the-spot fluidity tests to obtain the desired degree of modification.

If it is desirable to have a starch or wheat flour product which will retain approximately the same degree of thin boiling characteristics over a prolonged period of time, the process may include the added step of neutralization. The process can be successfully operated on a continuous basis as well as in a batch operation.

It is important to thoroughly agitate and disperse the starch so that the chlorine may act on the particles of the material being treated. It is important to have sufficient chlorine gas added to cause the starch to have the desired thin boiling characteristics. It is necessary to neutralize the product if a constant degree of fluidity is to be maintained through long storage. To accomplish this neutralization, the neutralizer must be thoroughly agitated with the starch material.

We are not limited to specific examples cited but it is important that there be a high concentration of chlorine, the starchy material to be treated must be in a thoroughly agitated condition while in the presence of such chlorine, and a suitable neutralizer may be used.

While we have given several specific examples of our invention in the foregoing specification, these examples have been given only for the purpose of further teaching the invention to those skilled in the art and may not therefore be construed or interpreted as limiting the scope of the invention which also admit of other equally effective embodiments.

What we claim is:

1. A dry method of treating a cereal flour to produce a modified starch product comprising the steps of:
   (a) providing a cereal flour having a moisture content within the range of 5 to 25%;
   (b) agitating said flour under conditions of normal atmospheric pressure and a temperature within the range of 60° to 150° F.; and
   (c) contacting the flour during said agitation with anhydrous chlorine gas at a concentration within the range of 0.2 to 4.0% by weight of the flour.

2. A dry method of treating a wheat flour to produce a modified flour product, in which substantially no gelatinization of the starch in said flour occurs, comprising the steps of:
   (a) providing a wheat flour having a moisture content within the range of 5 to 20% by weight;
   (b) agitating said flour at normal atmospheric pressure and room temperature; and
   (c) contacting said flour during said agitation with anhydrous chlorine gas at a concentration within the range of 0.2 to 4.0% by weight of the flour.

3. A dry method for treating a low protein wheat flour to produce a flour product having thin boiling starch characteristics, in which substantially no gelatinization of the starch in said flour occurs, comprising the steps of:
   (a) providing a wheat flour as it is normally produced in dry milling operations having a protein content of from 1 to 5% by weight and a moisture content within the range of 5 to 25% by weight;
   (b) agitating said flour at normal atmospheric pressure and room temperature.
   (c) contacting the flour during said agitation with anhydrous chlorine gas at a concentration within the range of 0.2 to 4.0% by weight of the flour; and
   (d) terminating said agitation and contacting when said flour has attained a desired level of fluidity within the range of 3 to 97.

4. The method of claim 3 in which the product therefrom is immediately neutralized to restore the said flour to about the same pH level as the material had prior to contacting with chlorine to thereby prevent further increases in alkaline fluidity.

References Cited in the file of this patent

UNITED STATES PATENTS

| | | |
|---|---|---|
| 798,509 | Hartwig | Aug. 29, 1905 |
| 813,647 | Haake et al. | Feb. 27, 1906 |
| 1,792,088 | Haake et al. | Feb. 10, 1931 |
| 1,851,749 | Bergquist | Mar. 29, 1932 |
| 1,871,027 | Bergquist | Aug. 9, 1932 |
| 2,221,552 | Nicolson | Nov. 12, 1940 |
| 2,698,818 | Staerkle | Jan. 4, 1955 |
| 2,894,859 | Wimmer et al. | July 14, 1959 |